(12) United States Patent
Wildeshaus

(10) Patent No.: US 6,602,158 B2
(45) Date of Patent: Aug. 5, 2003

(54) LUBRICANT FEED SYSTEM FOR A PLANETARY DRIVE

(75) Inventor: Walter Wildeshaus, Herzogenaurach (DE)

(73) Assignee: INA-Schaeffler KG, Herzogenaurach (DE)

(*) Notice: Subject to any disclaimer, the term of this patent is extended or adjusted under 35 U.S.C. 154(b) by 0 days.

(21) Appl. No.: 10/172,068

(22) Filed: Jun. 14, 2002

(65) Prior Publication Data
US 2003/0027680 A1 Feb. 6, 2003

Related U.S. Application Data

(63) Continuation of application No. PCT/EP00/11180, filed on Nov. 11, 2000.

(30) Foreign Application Priority Data
Dec. 14, 1999 (DE) .......................................... 199 60 157

(51) Int. Cl.[7] .............................................. F16H 57/04
(52) U.S. Cl. ..................................................... 475/159
(58) Field of Search ........................................ 475/159

(56) References Cited

U.S. PATENT DOCUMENTS

| | | | |
|---|---|---|---|
| 1,624,756 A | * 4/1927 | Nabstedt | 475/159 |
| 3,821,908 A | 7/1974 | Marsch et al. | 475/159 |
| 4,920,828 A | * 5/1990 | Kameda et al. | 475/159 |
| 5,609,538 A | * 3/1997 | Nogle et al. | 475/159 |
| 5,830,098 A | 11/1998 | Kimes | 475/159 |
| 5,910,063 A | 6/1999 | Kato | 475/159 |
| 5,928,100 A | 7/1999 | Ohtake et al. | 475/159 |
| 6,063,001 A | * 5/2000 | Sühling et al. | 475/159 |

FOREIGN PATENT DOCUMENTS

| | | |
|---|---|---|
| DE | 7000388 | 1/1970 |
| DE | 3002316 | 7/1980 |
| DE | 19534791 C1 | 11/1997 |
| DE | 19736686 A1 | 3/1998 |
| FR | 609531 | 7/1926 |
| GB | 2294308 A | 4/1996 |

\* cited by examiner

Primary Examiner—Sherry Estremsky
(74) Attorney, Agent, or Firm—Volpe and Koenig, P.C.

(57) ABSTRACT

A lubricant feed system for a planetary drive (1) is provided with a first guide (5) that guides the lubricant to first planet shafts (7), with at least one channel (6) passing through the wall (8a) of the planet carrier (8) in each of the first planet shafts (7), and at least one transverse channel (11) exiting each of the channels (6) to a second guide (12).

3 Claims, 1 Drawing Sheet

LUBRICANT FEED SYSTEM FOR A PLANETARY DRIVE

CROSS-REFERENCE TO RELATED APPLICATIONS

This application is a continuation of PCT/EP00/11180, filed Nov. 11, 2000.

BACKGROUND

This invention relates to a lubricant feed system for a planetary drive for the purpose of feeding lubricant, which moves by centrifugal force, to the bearings of the planet pinions in a first set of planets on first planet shafts, one end of which is held in a wall of the planet carrier, and to feed the lubricant to bearings of the planet pinions of a second set of planets separated from the first set of planets, at least in the longitudinal direction, by the wall of the planet carrier.

Planetary drives are generally used in automobile transmissions. Frequently, multiple sets of planets are placed in succession that are coupled together in these planetary drives. The planet pinions of these sets of planets rotate on planet shafts. One or both sides of the planet shafts in a set are held by planet carriers or flanges. Some of the planet pinions are supported by friction bearings, but most are supported on the shafts using roller bearings.

A big problem that has arisen since the conception of planetary drives is how to lubricate the bearings and how to dissipate the frictional heat through the lubricant. Generally, lubricating oil is used as the lubricant. The lubricating oil is often fed to the planetary drive from the direction of the drive or driven shaft of the sun gear located in the center of the planetary drive, or from another centrally located source of the planetary drive, for example one or more holes. From there, it is guided by centrifugal force to the individual lubrication points along combinations of narrow points such as gaps, channels and axial and radial bearings and guides. The individual narrow points produce flow restrictions and more or less hinder the flow of oil. In general, the lubrication points located closest to the source are sufficiently lubricated, but the lubrication points farther in line in the oil stream from the source are at a disadvantage, especially when they are difficult at best for oil to reach, such as the bearings of the planet pinions.

The feed and discharge of lubricant to (and from) the bearings of the planets is difficult since a design of this type leaves an amount of play and has design gaps that restrict or obstruct the flow of lubricant. The bearing location is lubricated through the planet shafts, into which a pocket is made that extends along the axis of the shaft, by transverse holes that start at the pocket and open up to the race of the bearing. It can also be lubricated by special notches or recesses made in the surface of the planet shafts. The oil guided to the bearing location of the planet is then supposed to flow out of the bearing past the planet pinion along the sides to the next lubrication point as a result of centrifugal force.

Planet bearings frequently fail prematurely during operation since there is insufficient oil available for lubrication and/or to dissipate the frictional heat generated in the bearings during operation.

Sufficient lubrication of the bearings of planets is generally ensured using special design features. Thus, the oil, which according to the prior art makes its way outward from one or more sources by being accelerated by centrifugal force in the planetary drive, is captured and guided toward the planet bearings, for example using a guide. The dynamic pressure produced by the centrifugal force is often used for better throughput of oil in the bearing. There are solutions wherein a guide means, designed as a baffle, captures and guides the oil, which is under dynamic pressure, to the bearing location through spiral oil notches made in the exterior of the planet shafts. In other variations, the lubricating oil is accumulated at the side of the planets facing the planet carrier. To this end, the interior periphery of the planet carrier is provided with a stage that captures the lubricating oil. The accumulated oil is then guided to the bearing location by a guide comprised of depressions made in the planet carrier and through special stop disks.

It is especially difficult to lubricate the bearings of the planets of sets of planets that are coupled together and/or are positioned in succession in a planetary drive. These sets of planets are located very close together and to other components with very small gaps to provide optimum functioning and to accommodate the scarcity of available space. The sets of planets are separated from one another mainly by a flange, a planet carrier or similar walls. To lubricate these types of planet sets, there are essentially two different means according to the prior art.

The objective then becomes, for example, to provide these types of planet bearings with an oil stream that originates as directly as possible from the source, without adding any other intermediate flow restrictions. To accomplish this, each stage of planets is provided with its own source of lubrication. Thus, in U.S. Pat. No. 5,830,098, a solution is described for a lubricant feed system of a planetary drive having two sets of planets in which the sets of planets are fed lubricating oil from separate sources originating from the sun gear. Lubricating oil is fed to the bearings of the planets in one set of planets by the wall of a guide panel, a pocket in each planet shaft and by transverse holes exiting the pockets. The oil fed from the sun gear is guided to the pocket and from there to the bearing locations by centrifugal force imposed along the wall of the guide panel. The other set of planets also has a guide panel that guides the oil stream to the bearing locations of this set of planets through pockets and transverse holes.

For design reasons, not all planetary gears allow the lubrication of the individual sets of planets from separate sources. Thus, there are solutions in which the oil, coming from a single source, either first passes through the bearing location of a planet of the planet set that is first in the oil stream and is led from there to the bearing locations of the planet set that is next, or is guided to the bearing locations of both sets of planets at the same time, for example using a common supply channel.

When the oil from a single source first passes through the planet bearings of the set of planets that is first in the oil stream and from there is led to the bearing locations of the set of planets next in the oil stream, the lubrication of the bearings first in line, which is made up of at least one set of planets, with the help of at least the guide described above, is sufficient. From these bearing locations, however, the oil flows with difficulty to the bearings next in line. The lubricating oil is held up in the first bearings or is conveyed only in insufficient quantities to the bearing locations next in line in the oil stream due to the throttling effects of narrow cross-sectional areas in the bearings. The oil stream is also restricted by the walls of the planet carrier that separate the individual sets of planets from one another. The lubricating oil must be guided around these walls or be guided through extra openings made in the walls. The guides mentioned above are usually ineffective or insufficient by themselves when these solutions are used since there is no longer enough lubricating oil available to be accumulated and further conveyed.

If the lubricating oil is guided from a single source to the bearing locations of both sets of planets at the same time, it frequently passes through a central distribution feed line leading to the bearing locations. The feed line often passes through holes in the planet carrier to a pocket in a common planet shaft and is then guided back to the bearings through transverse holes exiting the pocket. These types of lubricant feed systems are only possible using complicated and cost-intensive manufacturing methods.

GB 2 294 308 A describes a lubricant feed system for a planetary gear drive through which, by centrifugal force, two planetary gear sets are lubricated from the same source. The first and second planet sets are arranged in the longitudinal direction of the planetary drive, and are separated by a wall with a through path. The planet shafts of the first set of planets are mounted on one wall opposite the path. The planet shafts for the second set of planets are mounted on the wall. The planet shafts for the first as well as the second sets of planets have channels that extend in the longitudinal direction for lubricating the bearings. Cross channels extend from these channels to the bearings. The channels for the two planet sets are pocket holes, and convey back through the wall. They open to an oil plate of rubber. The oil plate made of rubber has radial oil channels that are arranged radially over the oil holes in the drive shaft. The oil channels lead from the oil hole in the drive shaft out and due to centrifugal force, radially out to the channels in the channels of the two planet sets. The channels of the first planet set open to the oil channels in the oil plate. In this way oil is passed from the oil hole in the drive shaft and to the oil channels in the planet shafts to the bearings of the first planet set. The distribution of oil stream from out of the drive shaft to the conducting arrangement for the first and second planet sets is purely by chance.

For sets of planets, in particular sets of planets separated by the wall of a planet carrier, wherein the oil stream has to be led from a single source to the planet bearings, there has been no satisfactory solution until the invention described below.

SUMMARY

The object of this invention is therefore to design a lubricant feed system for a planetary drive for the purposes of feeding lubricant, which moves by centrifugal force, to the bearings of planet pinions of a first set of planets on first planet shafts, one end of which is held at one longitudinally facing side of a planet carrier of the planetary drive, and to feed the lubricant to bearings of planet pinions of a second set of planets separated from the first set of planets by at least one wall of the planet carrier, with the lubricant feed system being simple to implement and cost-effective to manufacture.

This object is met according to the invention in that the lubricant feed system is provided with a first guide that guides the lubricant to the first planet shaft, with at least one channel in each of the first planet shafts that passes through the planet carrier, with at least one transverse channel exiting each channel and leading the lubricant to the bearings of the planet pinions of the first set of planets, and with a second guide that leads the lubricant exiting the channel toward the bearing of the second set of planets at the side where the second set of planets is located.

This method of solution feeds the lubricant, preferably lubricating oil, in sufficient quantity to the bearing locations of the bearings of the first set of planets as well as the second set of planets. The lubricant is guided by the first guide to the individual planet shafts of the first set of planets. The first set of planets is ahead of the second set of planets in the lubricant stream. The lubricant stream is split up in the channel of each planet shaft of the first set of planets. A portion of the lubricant flows through the transverse channels to the bearing locations of the planet pinions of the first set of planets. Another portion flows within the channel to the other side of the planet carrier and exits there. A second guide guides the lubricant from there to the bearings of the second set of planets. The number and the shape, in particular the cross-sectional area, of the channels and transverse channels, determines the quantity of the lubricant stream and the ratio at which the lubricant stream is split off to the bearing locations of the first set of planets and the second set of planets. By making changes to these channels, this ratio at which the lubricant stream is split off to the individual bearing locations can be influenced and thus changed at any time. Complicated and high cost transverse holes in the walls of the planet carrier are not necessary.

A preferred embodiment of the invention provides that the first guide comprises at least a circular baffle that is also placed concentric to the center of the planetary drive, and that the second guide is formed by making at least one depression in the wall of the planet carrier on the side where the second set of planets is located, extending from at least one channel radially outward toward the planet shafts of the second set of planets, as well as a guide panel that covers the depression, at least partially, in the longitudinal direction. One end of the planet shafts of the second set of planets is held in the wall of the planet carrier separating the sets of planets. The second guide panel can, for example, be fixed to one or more planet shafts and extends at least radially inwardly in the direction of the channels. For example, the guide panel can be formed by an appropriately sized stop disk for one or more planet pinions of the second set of planets. The depression is formed as a recess in the side of the wall of the planet carrier that faces the second set of planets. The guide panel covers this recess from the side and keeps the lubricant, which exits the channel, inside the depression. The lubricant in the depression is guided radially outwardly by centrifugal force and flows to the planet shafts of the second set of planets. From there, the lubricant is guided along, for example, notches in the planet shafts, or along special stop disks, to the bearing locations of the planet pinions. The depressions can be made simply and cost-effectively without the need for machining when the planet carrier is manufactured. It is not necessary to machine guide channels into the parts.

The axial and radial dimensions of the depression can be designed arbitrarily. However, it is preferable to provide it as an annular notch that connects all channels to notches that discharge radially outwardly from the annular notch to the planet shafts.

Finally, an embodiment of the invention is provided in which the channel in the first planet shafts runs in the longitudinal direction of the planetary drive and is formed by a cylindrical hole located preferably concentric to the longitudinal axis of the planet shafts. A penetrating hole of this type can be made by drilling or it can exist already by manufacturing the planet shaft from tubular semi-finished product. The transverse channels are designed as transverse holes or are stamped in. The cross-sectional areas, in particular of the channels, can be tailored very precisely to the lubricant required and to the ratio mentioned above through calibration.

BRIEF DESCRIPTION OF THE DRAWINGS

This invention is explained in more detail below on the basis of a preferred embodiment.

The drawing FIGURE shows a preferred embodiment of a lubricant feed system according to the invention in a sectional view.

DETAILED DESCRIPTION OF THE PREFERRED EMBODIMENT

Figure 1:
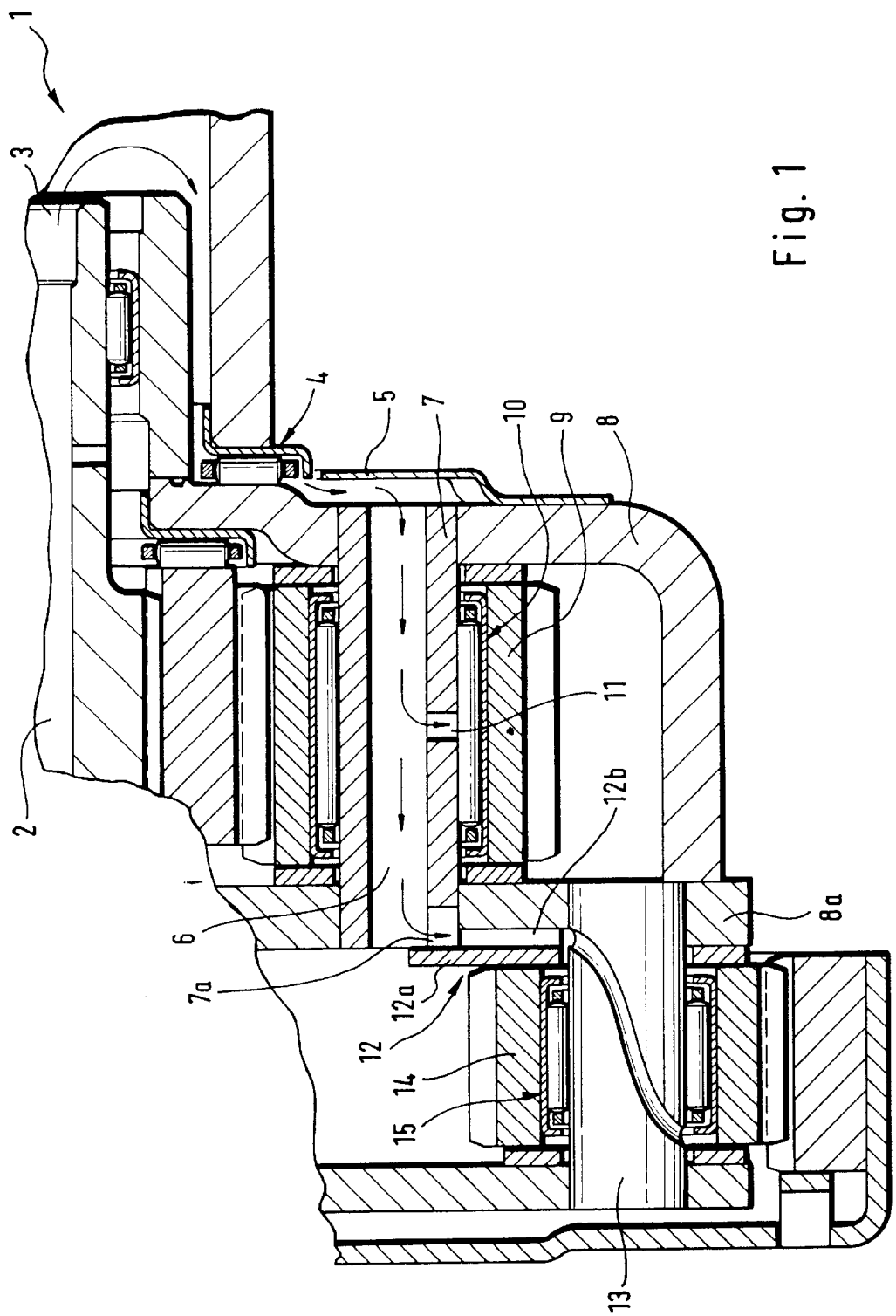

In FIG. 1, a partial view, in cross-section, of a planetary drive 1 is shown. Oil passes from a central shaft 2, which is coupled to a sun gear, from opening 3 through an axial bearing 4 radially outward to a first guide 5. The first guide 5 collects the lubricant and guides it to a channel 6 in a first planet shaft 7, formed as a through hole.

The planet shaft 7 is held in a planet carrier 8 and penetrates a wall 8a of the planet carrier 8. A planet pinion 9 of a set of planets, that includes further planet pinions 9 that are not shown, rotates on the first planet shaft 7 by means of a bearing 10. A transverse channel 11 leads from the channel 6 to the bearing 10. The lubricant stream guided by the first guide 5 to the channel is split up in the channel 6. A portion of the lubricant stream flows through the transverse channel 11 into the bearing 10 of the planet pinion 9. The other portion of the lubricant stream flows in the channel 6 through the wall 8a of the planet carrier 8 and is met by a second guide 12 at the end of the first planet shaft 7.

The second guide 12 comprises a guide panel 12a and a depression 12b. The depression 12b extends from the channel 6 toward a second planet shaft 13. A planet pinion 14 is mounted on the second planet shaft 13. The planet pinion 14 is a pinion from a second set of planets, not shown, that includes further planet pinions 14 that are supported on second planet shafts 13. The guide panel 12a also serves as a stop disk to axially keep the planet pinion 14 in place at the wall 8a of the planet carrier 8. The first planet shaft 7 is provided with a recess 7a with the same depth as the depression 12b. The lubricant moves by centrifugal force within the depression 12b along the guide panel 12a to the bearing 15 of planet pinion 14 on the second planet shaft 13.

Reference Number List

1 Planetary Drive
2 Central Shaft
3 Opening
4 Axial Lager
5 First Guide
6 Channel
7 First Planet Shaft
7a Recess
8 Planet carrier
8a Wall
9 Planet pinion
10 Bearing
11 Transverse Channel
12 Second Guide
12a Guide Panel
12b Depression
13 Second Planet Shaft
14 Planet Pinion
15 Bearing

What is claimed is:

1. A lubricant feed system for a planetary drive to feed lubricant, which moves by centrifugal force, to bearings of planet pinions in a first set of planets on first planet shafts, one end of each of which is held in a wall of a planet carrier, and to feed the lubricant to second bearings of second planet pinions of a second set of planets separated from the first set of planets, at least in the longitudinal direction, by the wall of the planet carrier, the system comprising a first guide that guides the lubricant to the first planet shafts, at least one channel in each of the first planet shafts that passes through the wall, at least one transverse channel exiting the at least one channel and leading the lubricant to the bearings of the planet pinions of the first set of planets, and with a second guide arranged for the second set of planets, with the first set of planets being arranged upstream in a lubricant flow path from the second set of planets, whereby the first and second guides are connected via the at least one channel, so that the lubricant passes from at least one of the first guide and the at least one channel to the second guide and then to the second bearings of the second planet pinions.

2. A lubricant feed system according to claim 1, in which the first guide comprises at least a circular baffle that is placed concentric to a center axis of the planetary drive, and the second guide comprises at least one depression in the wall of the planet carrier on a side where the second set of planets is located, extending from the at least one channel radially outward toward at least one second planet shaft, and at least one guide panel that at least partially covers the at least one depression in a longitudinal direction, wherein one end of the at least one second planet shaft is held in the planet carrier, the at least one second planet shaft also holding at least one bearing of the second planet pinions of the second set of planets, and wherein the guide panel starts from the at least one second planet shaft and extends at least radially inwardly in a direction of the at least one channel.

3. A lubricant feed system according to claim 1, wherein the at least one channel extends in the longitudinal direction of the planet drive and is formed by a cylindrical through hole.

\* \* \* \* \*